United States Patent
Sundararajan et al.

(10) Patent No.: US 11,403,392 B2
(45) Date of Patent: Aug. 2, 2022

(54) SECURITY HANDLING DURING APPLICATION CODE BRANCHING

(71) Applicant: International Business Machines Corporation, Armonk, NY (US)

(72) Inventors: Mukundan Sundararajan, Bangalore (IN); Priti Srikrishnan, Bangalore (IN); Jignesh K. Karia, Thane (IN)

(73) Assignee: International Business Machines Corporation, Armonk, NY (US)

(*) Notice: Subject to any disclaimer, the term of this patent is extended or adjusted under 35 U.S.C. 154(b) by 298 days.

(21) Appl. No.: 16/734,482

(22) Filed: Jan. 6, 2020

(65) Prior Publication Data

US 2021/0209226 A1  Jul. 8, 2021

(51) Int. Cl.
| | |
|---|---|
| *G06F 21/00* | (2013.01) |
| *G06F 21/54* | (2013.01) |
| *G06F 21/56* | (2013.01) |
| *G06F 8/73* | (2018.01) |
| *G06F 21/14* | (2013.01) |
| *G06F 21/12* | (2013.01) |

(52) U.S. Cl.
CPC .............. *G06F 21/54* (2013.01); *G06F 8/73* (2013.01); *G06F 21/125* (2013.01); *G06F 21/14* (2013.01); *G06F 21/562* (2013.01)

(58) Field of Classification Search
CPC .......... G06F 21/54; G06F 8/73; G06F 21/125; G06F 21/14; G06F 21/562; G06F 21/52
See application file for complete search history.

(56) References Cited

U.S. PATENT DOCUMENTS

| | | | | |
|---|---|---|---|---|
| 5,724,585 | A * | 3/1998 | Hassitt | G06F 9/445 713/1 |
| 6,014,666 | A * | 1/2000 | Helland | G06F 9/468 707/999.009 |
| 7,058,561 | B1 * | 6/2006 | Kumar | G06F 8/49 703/22 |
| 9,122,872 | B1 * | 9/2015 | Rusakov | G06F 21/565 |

(Continued)

FOREIGN PATENT DOCUMENTS

| | | | | |
|---|---|---|---|---|
| CN | 111095249 A | * | 5/2020 | .......... G06F 12/145 |
| WO | 2018027244 A2 | | 2/2018 | |

OTHER PUBLICATIONS

Assal, Hala et al., "Security in the Software Development Lifecycle", USENIX Association, Fourteeth Symposium on Usable Privacy and Security, Aug. 12, 2018, 17 pgs.

(Continued)

*Primary Examiner* — John B King
(74) *Attorney, Agent, or Firm* — Rakesh Roy; Hunter E. Webb; Keohane & D'Alessandro, PLLC

(57) ABSTRACT

Aspects of the present invention provide an approach for security handling of application code branching from requirements elicitation through the software development lifecycle (SDLC) to deployment and operation. In an embodiment, a set of security rules is collected related to a defined security policy (e.g., of an organization). During a requirements elicitation phase, any code branches which go outside of its current execution space are dynamically identified using natural language techniques. A potential gap is reported in a generated gap document when an identified code branch is not consistent with the set of security rules.

20 Claims, 5 Drawing Sheets

(56) References Cited

U.S. PATENT DOCUMENTS

| | | | | |
|---|---|---|---|---|
| 9,135,414 | B1* | 9/2015 | Biffle | G06F 21/128 |
| 9,792,443 | B1* | 10/2017 | Sheridan | G06F 21/577 |
| 2004/0194104 | A1* | 9/2004 | Beresnevichiene | G06F 21/52 |
| | | | | 718/100 |
| 2006/0080737 | A1* | 4/2006 | Freeman | G06F 21/564 |
| | | | | 726/24 |
| 2012/0159193 | A1* | 6/2012 | Spradlin | G06F 21/79 |
| | | | | 713/190 |
| 2013/0227516 | A1* | 8/2013 | Kriegsman | G06F 8/75 |
| | | | | 717/101 |
| 2016/0357660 | A1* | 12/2016 | Dean | G06F 8/00 |
| 2017/0220331 | A1* | 8/2017 | Seibel | G06F 21/566 |
| 2017/0329962 | A1* | 11/2017 | Ikuse | H04L 63/14 |
| 2019/0114435 | A1 | 4/2019 | Bhalla et al. | |
| 2019/0180035 | A1* | 6/2019 | Esperer | G06F 21/577 |
| 2019/0303541 | A1* | 10/2019 | Reddy | H04L 9/0643 |
| 2019/0318081 | A1* | 10/2019 | Gupta | G06F 21/52 |
| 2019/0318091 | A1* | 10/2019 | Gupta | G06F 21/566 |
| 2021/0056201 | A1* | 2/2021 | Eftekhari Roozbehani | |
| | | | | G06F 21/53 |

OTHER PUBLICATIONS

Rehman et al., "An Effective Security Requirements Engineering Framework for Cyber-Physical Systems", MDPI Technologies, 2018, 20 pgs.

* cited by examiner

SECURITY HANDLING DURING APPLICATION CODE BRANCHING

TECHNICAL FIELD

The subject matter of this invention relates generally to security risk identification. More specifically, aspects of the present invention provide a solution for security handling of application code branching from requirements elicitation through the software development lifecycle (SDLC) to deployment and operation.

BACKGROUND

In computer security, a vulnerability is a weakness which can be exploited to perform unauthorized actions within a computer system. To exploit a vulnerability, an attacker can have at least one applicable tool or technique that can connect to a system weakness. Vulnerability management is the cyclical practice of identifying, classifying, remediating, and mitigating vulnerabilities. Security vulnerabilities in software code are a known genre of problems for which there has been a number of point solutions that address each issue when it comes up. There are two large classes of security issues, one from the application programs that leave security holes to be exploited, and the second being rogue or infectious programs that run on the operating system maliciously. Anti-virus programs are the typical solutions for the second class of security issues.

SUMMARY

In general, aspects of the present invention provide an approach for security handling of application code branching from requirements elicitation through the software development lifecycle (SDLC) to deployment and operation. In an embodiment, a set of security rules is collected related to a defined security policy (e.g., of an organization). During a requirements elicitation phase, any code branches which go outside of its current execution space are dynamically identified using natural language techniques. A potential gap is reported in a generated gap document when an identified code branch is not consistent with the set of security rules.

One aspect of the invention provides a method for security handling of application code branching, comprising: collecting a set of security rules related to a defined security policy; applying the set of security rules to an application having a plurality of code branches; dynamically identifying, during an elicitation of requirements phase, a code branch, within the application, which executes outside of its current execution space, wherein the identifying includes using natural language processing on a set of documents related to the application; and generating, when a return from the code branch is inconsistent with the set of security rules, representing a potential security gap, a gap document including the potential security gap.

Another aspect of the invention provides a computer program product embodied in a computer readable medium that, when executed by a computer device, performs a method for security handling of application code branching, the method comprising: collecting a set of security rules related to a defined security policy; applying the set of security rules to an application having a plurality of code branches; dynamically identifying, during an elicitation of requirements phase, a code branch, within the application, which executes outside of its current execution space, wherein the identifying includes using natural language processing on a set of documents related to the application; and generating, when a return from the code branch is inconsistent with the set of security rules, representing a potential security gap, a gap document including the potential security gap.

Yet another aspect of the invention provides a computer system for security handling of application code branching, the computer system comprising: a memory medium comprising program instructions; a bus coupled to the memory medium; and a processor for executing the program instructions, the instructions causing the system to: collect a set of security rules related to a defined security policy; apply the set of security rules to an application having a plurality of code branches; dynamically identify, during an elicitation of requirements phase, a code branch, within the application, which executes outside of its current execution space, wherein the identifying includes using natural language processing on a set of documents related to the application; and generate, when a return from the code branch is inconsistent with the set of security rules, representing a potential security gap, a gap document including the potential security gap.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
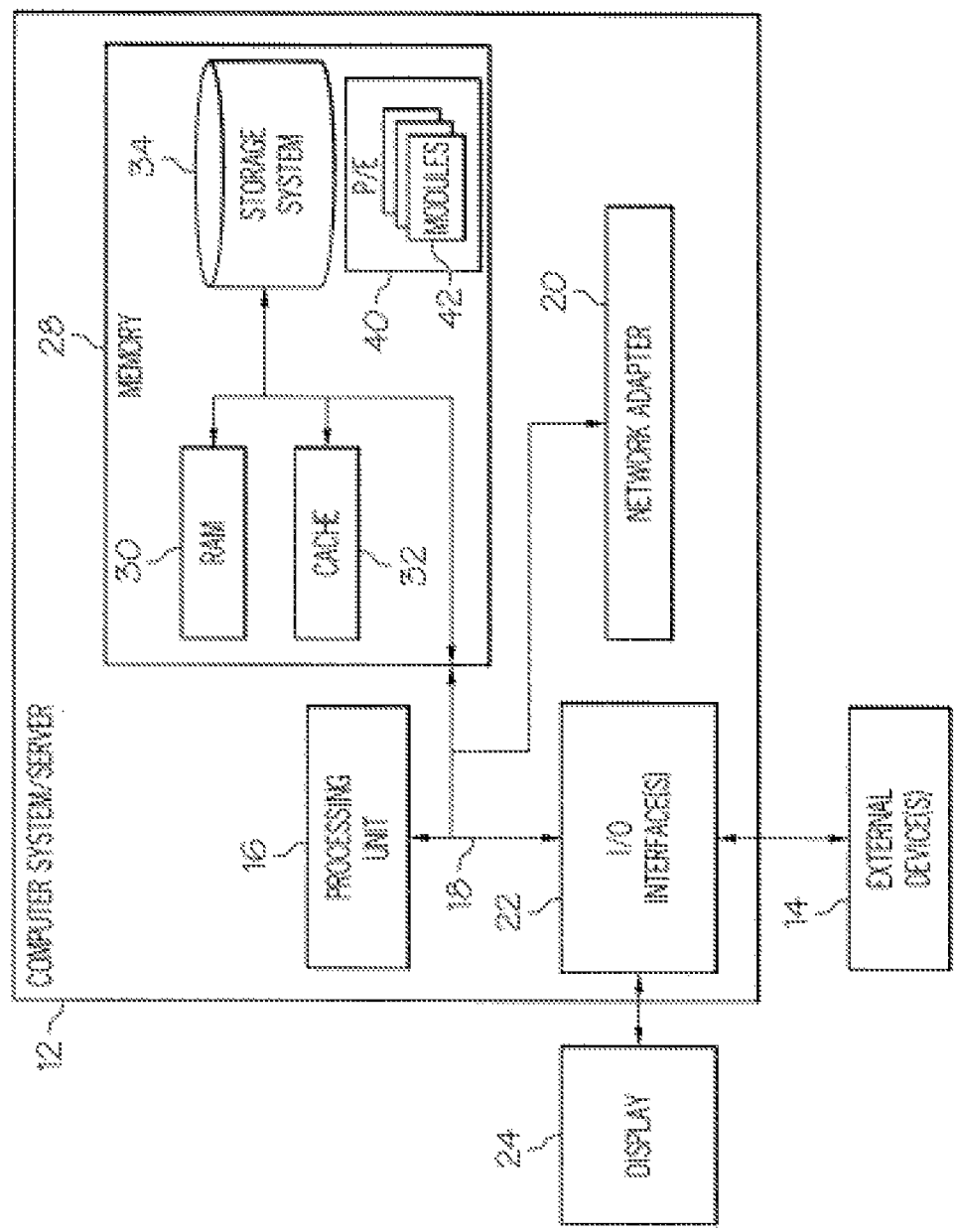
FIG. 1 depicts a data processing system 10 according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

The inventors of the invention described herein have discovered deficiencies in the current solutions for security handling of application code branching from requirements elicitation through the software development lifecycle (SDLC) to deployment and operation. A software vulnerability is a system flaw or weakness in an application that could be exploited to compromise the security of the application. Once an attacker has found a flaw, or software vulnerability, and determined how to access it, the attacker has the potential to exploit the vulnerability. As stated, there are two large classes of security issues, one from the application programs that leave security holes to be exploited and the second being rogue or infectious programs that run on the operating system maliciously.

For the first class, one of the key sources of vulnerabilities is that branches of the code may terminate or return in a fashion that is inconsistent with a security philosophy. These inconsistencies are typically covered by a security layer that provides a secondary or tertiary cover. However, there is a possibility of the primary layer of the code branches being inconsistent in their return due to the incompleteness of requirements that do not specify or do not handle the branch terminations formally. Typical vulnerabilities that can be checked include, but are not limited to, structured query language (SQL) injection, broken authentication and session management, cross-site scripting (XSS), insecure direct object references, security misconfiguration, sensitive data exposure, missing function level control, cross-site request forgery (CSRF), using components with known vulnerabilities, unvalidated redirects and forwards, and/or a distributed denial of service (DDOS).

Typically, the point of an SQL injection attack is to compromise a database, which is an organized collection of data and supporting data structures. The data can include user names, passwords, text, etc. This type of attack type can give an adversary complete control over a web application database by inserting arbitrary SQL code into a database query. A broken authentication and session management vulnerability occurs when there is no continued authentication in a system and an impersonation happens that the system is not aware of leading that can lead to a corrupted state and/or misuse of the system. Cross-site scripting (XSS) is a type of computer security vulnerability typically found in web applications. XSS can enable attackers to inject client-side scripts into web pages viewed by other users. A cross-site scripting vulnerability may be used by attackers to bypass access controls such as the same-origin policy.

Insecure direct object references occur when an application provides direct access to objects based on user-supplied input. As a result of this vulnerability, attackers can bypass authorization and access resources (e.g., databases, files, etc.) in the system directly. Security misconfiguration occurs when an application unintentionally changes a security configuration that creates an opening for a potential attack. Sensitive data exposure occurs when an application does not adequately protect sensitive information. The data can vary and anything from passwords, session tokens, credit card data to private health data and more can be exposed. If the authentication check in sensitive request handlers are insufficient or non-existent, the vulnerability can be categorized as missing function level access control. An example of this would be an unauthorized user being able to access a uniform resource locator (URL) that contains any sensitive information or exposes functionality intended only for authorized users.

Cross-site request forgery (CSRF) is an attack that forces an end user to execute unwanted actions on a web application in which they are currently authenticated. CSRF attacks specifically target state-changing requests, not theft of data, since the attacker has no way to see the response to the forged request. Using components with known vulnerabilities is a vulnerability in which requested services from other components or sites are known to have a weaker security position. Unvalidated redirects and forwards are possible when a web application accepts untrusted input that could cause the web application to redirect the request to a URL contained within untrusted input. By modifying untrusted URL input to a malicious site, an attacker may successfully launch a phishing scam and/or steal user credentials. A DDOS attack is a cyber-attack in which the perpetrator seeks to make a machine or network resource unavailable to its intended users by temporarily or indefinitely disrupting services of a host connected to the Internet. DDOS is typically accomplished by flooding the targeted machine or resource with superfluous requests in an attempt to overload systems and prevent some or all legitimate requests from being fulfilled.

As mobile, Internet of Things (IOT), cloud-based infrastructures, and other newer technological opportunities increase, the security of transactions is paramount. However, security is still often more an afterthought than a consideration during requirements elicitation. Because of this, blind spots and vulnerabilities can be carried forward. Tools exist (e.g., website vulnerability scanners, cloud-based vulnerability scanners, etc.) to determine whether code vulnerabilities exist, but each of these look at a specific type or class of vulnerabilities or are specific to a particular platform (e.g., web, cloud, enterprise perimeter, etc.). The inventors recognize that these solutions look for specific vulnerabilities in a group and attempt to identify them from the code or during execution in determining the vulnerable pathways by testing for specific point problems and determining if there is vulnerability. Hence, these are essentially audit tools in the code-running environment that provide a security audit and compliance reporting through active verification for any vulnerabilities.

In addition, there are code scan tools that look at vulnerabilities after they have been introduced during a code development phase. While these identify the specified vulnerabilities, the inventors recognize that these are mainly reactive to identify vulnerabilities introduced in the development phase to allow for correcting them. Tools used during testing can detect an existence of a security hole or other vulnerability by testing specifically for distinctive security flaws. However, not all vulnerabilities can be detected. A specific example involves a distributed denial of service (DDOS) and what is known as a "man in the middle". A DDOS attack is a malicious attempt to disrupt normal traffic of a targeted server, service, or network by overwhelming the target or its surrounding infrastructure with a flood of Internet traffic. The man in the middle issue is one where a secure information exchange is caught by a spurious intermediary who later uses this information to either trigger more transactions within the secure entry already made or to create secure entries and transactions later on. With the advent of extensive use of wireless communications and the inability to encrypt each message appropriately, the man in the middle has become a major security issue for systems.

As indicated above, aspects of the present invention provide an approach for security handling of application code branching from requirements elicitation through the software development lifecycle (SDLC) to deployment and operation. In an embodiment, a set of security rules is collected related to a defined security policy (e.g., of an organization). During a requirements elicitation phase, any code branches which go outside of its current execution space are dynamically identified using natural language techniques. A potential gap is reported in a generated gap document when an identified code branch is not consistent with the set of security rules.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

As stated, the core problem the inventors seek to solve is that currently application security is typically considered, at the earliest, at a planning and/or design time and then verified when coding has been completed through various tests to see if there are any vulnerabilities. This is not efficient because it doesn't delve into any coding issues, such as when data comes into the application through a variable space from an external source.

Figure 2:
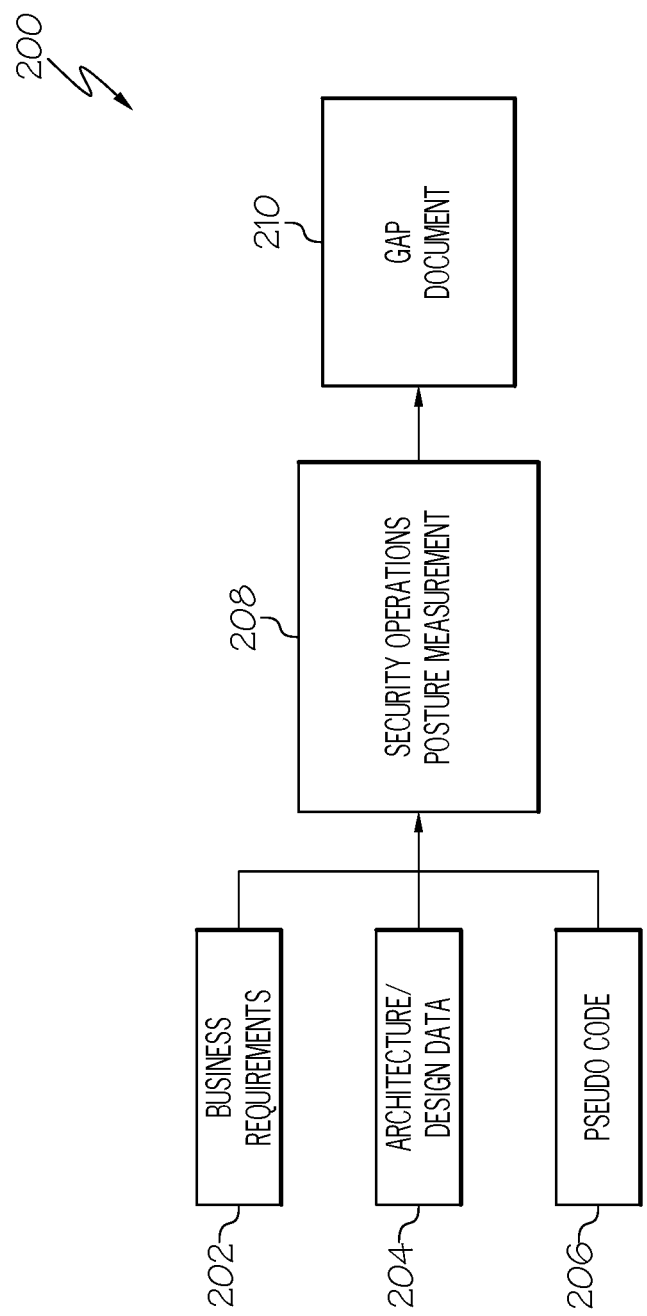
FIG. 2 depicts an example flow diagram 200 for the pre-building stages of a software design lifecycle (SDLC) according to an embodiment of the invention.

FIG. 2 shows an example process flow diagram 200 for the pre-building stages of a software design lifecycle (SDLC) according to an embodiment of the invention. An SDLC is a process commonly used by the software industry to design, develop, and test high quality software. It typically includes several distinct stages, including planning, design, building, testing, and deployment. Pre-implementation sources are shown including business requirements 202, architecture/design data 204, and pseudo code 206. Business requirements 202 (or "requirements") for an application should indicate any security needs at different positions in the code (e.g., user interface points, database requests, etc.) and how those needs should be handled. This information is typically laid out in a business requirements document.

Architecture/design data 204 can include a design document which typically describes the architecture used in the development of a particular software product. It usually includes a diagram that depicts the envisioned structure of the software system. Pseudo code 206 is an informal high-level description of the operating principle of a computer program or other algorithm. It uses the structural conventions of a normal programming language but is intended for human reading rather than machine reading. The listed sources are exemplary and not intended to be construed as limiting in determining whether any security policies or principles have been met within the application. Any other source data not listed but deemed relevant to making such a determination can be used.

Security operations posture measurement 208 can determine, using the provided sources listed above, whether any security vulnerabilities within the code might exist. A security posture of an organization refers to its overall security plan—the approach the organization takes to security, from planning to implementation. It is typically comprised of technical and non-technical policies, procedures, and controls that protect from internal and/or external threats which can exploit vulnerability. A vulnerability or security gap is a weakness which can be exploited by a threat actor, such as an attacker, to perform unauthorized actions within a computer system. Any security gaps can be reported in a generated gap document 210 which can be used so that the gaps can be fully addressed. Gap document 210 can include any suitable file type, such as a web page, portable document format (PDF) file, email, word processing document, spreadsheet document, text file, and/or the like.

Figure 3:
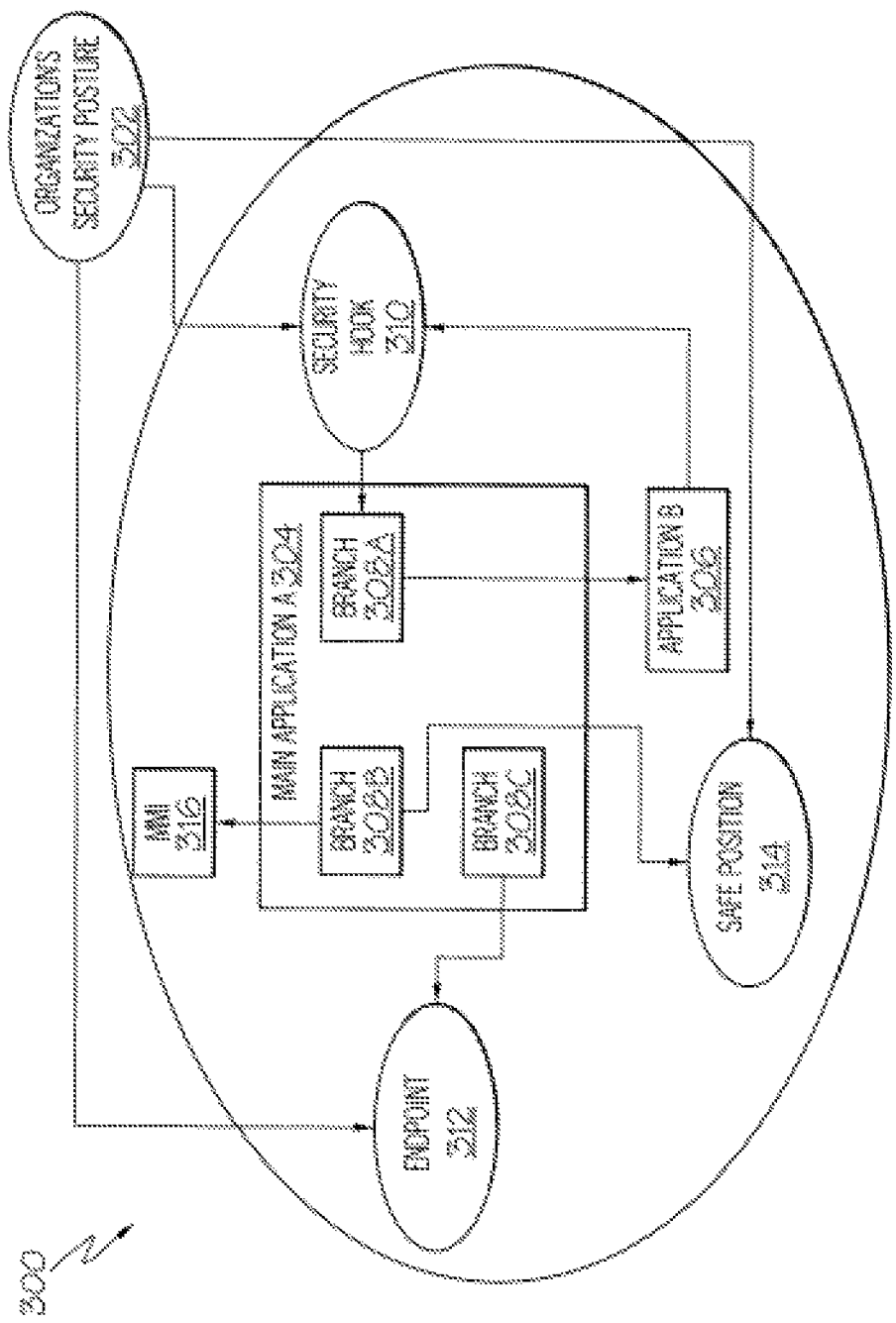
FIG. 3 depicts an example process flow diagram 300 for security handling using an overarching security posture according to an embodiment of the invention.

FIG. 3 shows an example process flow diagram 300 for security handling using an overarching security posture according to an embodiment of the invention. As shown, diagram 300 includes an organization's security posture 302, main application A 304, external application B 306, branches 308A-C, security hooks (or "hook") 310, endpoint 312, and safe position 314. In this example, main application A includes three code branches (or "branches") which go outside (e.g., access data, access a service, etc.) of its current execution space or memory. As stated, the requirements should address any security needs of an application to ensure any gaps/vulnerabilities are being addressed. In the requirements, any code branches can be described including those that go outside of a current execution space. A branch is an instruction in a computer program that can cause a computer to begin executing a different instruction sequence and thus deviate from its default behavior of executing instructions in order. Branch (or branching, branched) may also refer to the act of switching execution to a different instruction sequence as a result of executing a branch instruction. Branch instructions are used to implement control flow in program loops and conditionals (i.e., executing a particular sequence of instructions only if certain conditions are satisfied). A branch instruction can be either an unconditional branch, which always results in branching, or a conditional branch, which may or may not cause branching depending on some condition.

As shown, branch 308A branches to application B 306. Upon returning, logic in security hook 310 can be executed. Branch 308B branches to safe position 314 and man machine interface (MMI) 316 and branch 308C branches to endpoint 312. If how to handle a particular security need is not specified within the application, then any overarching organizational security policies and/or principles (i.e., security posture 302) can be applied. In the requirements, any code branches can be described including those that go outside of a current execution space. When an application begins executing, it has its executable code in memory (as well as any variables stored in memory, operating system-related resources, etc.). Unwelcome intrusions typically come into the application through a variable from a code branch. For example, the code can branch in order to access data from a database, receive a response from a service request, receive input data from a user interface, and/or the like. In any case, the code has branched and stopped execution in its current memory space waiting for data to come into the space from outside increasing the risk of attack. Aspects of security handling of application code branching from requirements elicitation to operation are described in greater detail below.

Figure 4:
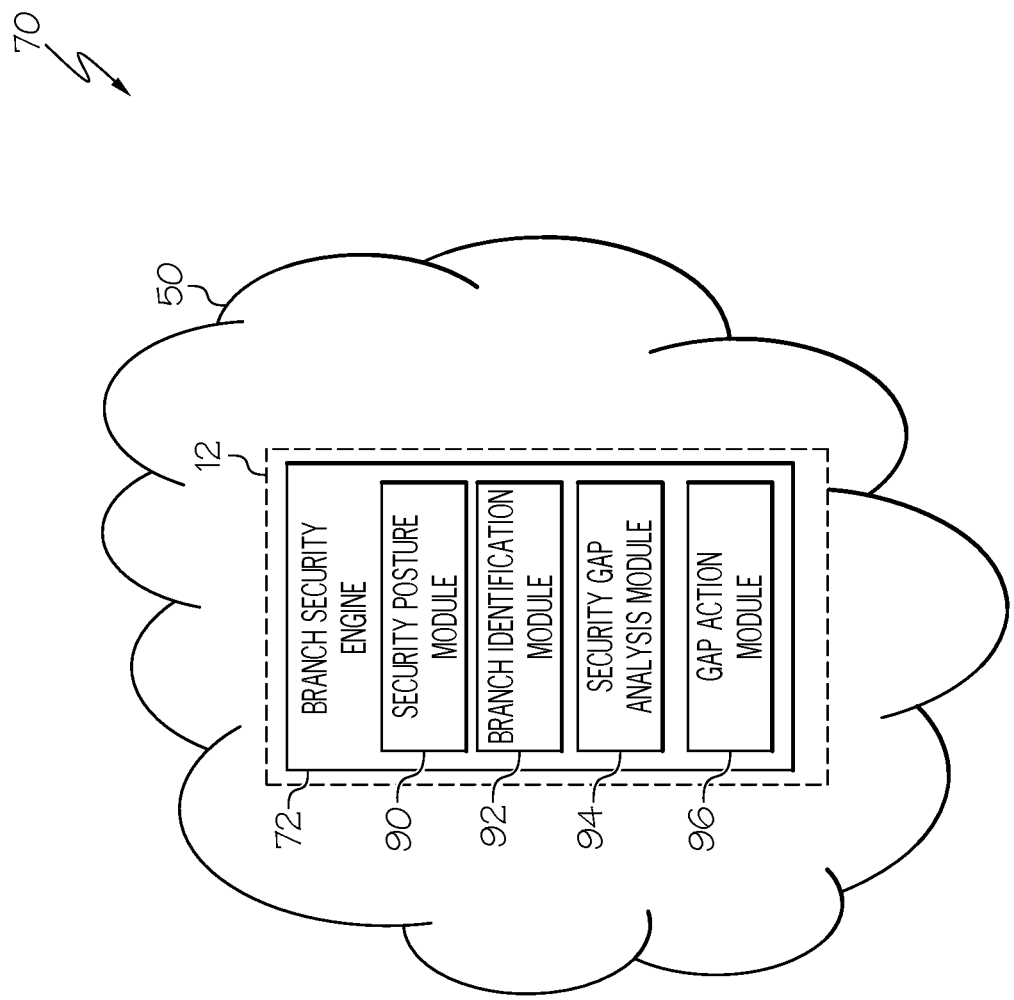
FIG. 4 depicts a system diagram 70 according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. As depicted, branch security engine (hereinafter "system 72") is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to processing of audio/visual information (e.g., in a cognitive and/or network computing environment). Such other system(s) have not been shown in FIG. 4 for brevity purposes.

Along these lines, system 72 may perform multiple functions similar to a general-purpose computer. Specifically, among other functions, system 72 can provide security handling of application code branching from requirements elicitation to operation. To accomplish this, system 72 can include: a security posture module 90, a branch identification module 92, a security gap analysis module 94, and a security gap action module 96. As stated, system 72 can provide an early identification of security requirements and actions related to an application to identify and mitigate potential vulnerabilities and threats in security positions by analyzing the stated functional needs of the application.

Security posture module 90 of system 72, as executed by computer system/server 12, is configured to collect a set of security rules related to a defined security policy (e.g., of an organization). In an embodiment, the set of security rules can be derived from any number of sources. For example, business requirements 202, architecture/design data 204, and/or pseudo code 206 can indicate any security needs at different positions in the code (e.g., user interface points, database requests, etc.) and how those needs should be handled. If one or more needs are not specifically addressed, an overarching security policy (e.g., organizational-level security rules and/or principles, etc.) can be applied to determine how a particular security need can be handled. To that end, the set of rules are applied to the application's stated functional needs.

Branch identification module 92 of system 72, as executed by computer system/server 12, is configured to identify any code branches of an application which execute outside (e.g., access data, access a service, etc.) of its current execution space or memory. Branch identification module 92 determines where the outside calls are likely to be at during a requirements elicitation stage itself and not when the code development is done. When the code has been written, the outside calls are typically easily visible in the code so making the recommendations for security positions is easy. However, when the requirements are still being collected, identifying the likely points of external calls cannot be done manually because the innate knowledge of how the code is likely to develop is not fully known, either to the user or the engineer collecting the requirements.

A security position for the outside function is identified and a security position upon return from the function step is computed or determined. Any data coming into an application changes the status quo within the application's executing memory space introducing a potential security risk. For example, authentication information can be returned as part of a SQL (database) request. Authentication can be used by a database server when the server needs to know exactly who is accessing its information. In authentication, the user (or computer or application) has to prove its identity to the server. Usually, authentication by a server entails the use of a user name and password. Authentication does not determine what tasks the user can do or what files the user can see. Authentication merely identifies and verifies the user attempting to make the connection. When the authentication information is sent over and returned as part of data request, it can be compromised if not encrypted. During a design stage, NLP processing techniques can be used to extract/identify code branches from the application.

Security gap analysis module 94 of system 72, as executed by computer system/server 12, is configured to identify any potential gaps/vulnerabilities due to an identified code branch not being adequately addressed per a security policy. Returning back to the authentication example above, a requirement can specify that any sensitive information (e.g., login/password data of a customer) coming in must be encrypted. For example, a browser interface must require Hypertext Transfer Protocol Secure (HTTPS) for secure communication over a network.

For a typical client-server interaction, any existing security mechanisms that encrypt and send such data can be required. A further requirement can specify that when the code branch returns back to execute in the application space, the first thing that can be checked is whether any existing security rules are being met. In this example, a requirement would be to verify that data with relation to the authentication is being returned in encrypted form and, if not, security gap analysis module 94 identifies that a security gap exists. In short, any time there is a branch (e.g., to a user interface, another application, database, etc.), security gap analysis module 94 should query to check that an authenticated response is obtained and maintained. These things that are related to security should be addressed when eliciting business requirements. If not, security gap analysis module 94 can use any NLP technique(s) now known or later developed to review the requirements and identify branches having no security position defined, which can result in security gaps, when the code returns back from such branches.

Gap action module 96 of system 72, as executed by computer system/server 12, is configured to generate a gap document during an eliciting of requirements when any potential security gaps are detected. The gap document can show a determination of security values and settings expected and issues from the gaps identified with respect to the security policy and posture in the application on analysis of the requirement statements. The analysis of the requirement statements can consider threats to the information and data security from inconsistent security values and to a stable operation environment under transaction volume and cycle time stress.

This information can assist a user (e.g., a business analyst) to ensure any security-related questions are being addressed. As stated, any related documents (e.g., business requirements, architecture and/or design documentation, pseudo code, etc.) can be reviewed using, for example, NLP techniques to identify whether the security states are consistent when any code branches (e.g., business rules, constraint statements, etc.) and, if not, a gap document can be generated for use when addressing such gaps.

The gap document can enable a taking of mitigating steps including selecting from defined security hooks, security positions or end points related to data/information handling to determine if the previous gaps have been successfully mitigated. If not successfully mitigated, highlighting or alerting if any threats to the data/information.

In an embodiment, upon finding a gap in a security position on return from a function, a selection of appropriate options can be made from a response group consisting of a security hook that has a defined set of security rules on the data/information current in the application instance and handling of the same that resolves the inconsistencies and returns back to the application to continue with the operation.

In addition, gap action module 96 can prevent the application so that it cannot continue. For example, gap action module 96 can immediately, but safely, terminate the application. If not directly addressed in the code, branch security may default to an organizational-level policy. For example, an organization's security policy, as part of its design architecture, may require that no customer's username and password should be stored in global variables. A global variable is a variable type that is declared outside any function and is accessible to all functions throughout the program. The security procedure can be enforced in a layer between the operating system (OS) and the application. To that end, the application can connect to a security hook in the intermediate layer. A hook is a place in code that allows for an insertion of customized programming. The customized programming is typically used to provide different behavior or react when a particular event happens. For example, a hook can ensure whatever an existing security policy specifies is being done.

Returning to the global variable example, assume an application is terminating at the end of its execution with no security verification being done there. The hook, pursuant to the organization's security policy, can ensure the variable contents in memory are cleaned up (e.g., cleared from memory). Any time a branch goes out of the thread/execution space or when the application terminates, a gap document can further indicate branches where no security specifications exist. If a developer has not specified security checks in the application, the organizational layer through its hooks will ensure the security policies are being met resulting in a lower vulnerability risk because any gaps are covered.

Figure 5:
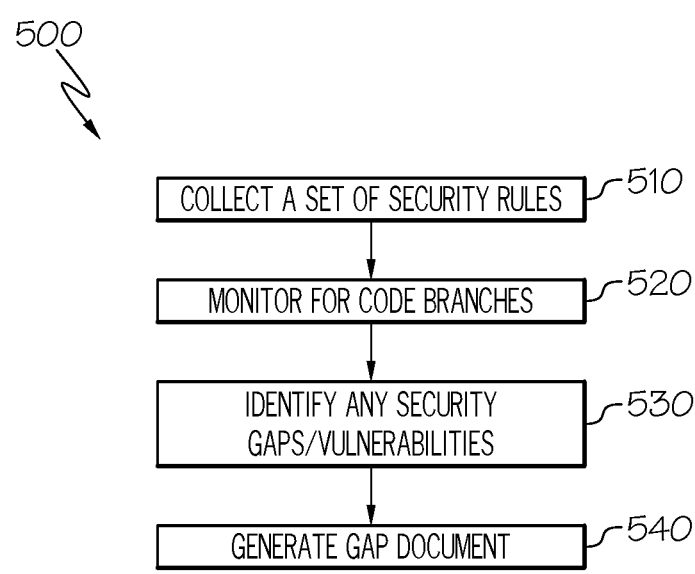
FIG. 5 depicts an example process flowchart 500 according to an embodiment of the present invention.

Referring now to FIG. 5 in conjunction with FIG. 4, a process flowchart 300 according to an embodiment of the present invention is shown. At 510, security posture module 90 of system 72, as executed by computer system/server 12, collects a set of security rules related to a defined security policy (e.g., of an organization). At 520, branch identification module 92 of system 72, as executed by system/server 12, identifies any code branches of an application which go outside (e.g., access data, access a service, etc.) of its current execution space or memory. At 530, security gap analysis module 94 of system 72, as executed by system/server 12, identifies any potential gaps/vulnerabilities due to an identified code branch, upon returning from its branching operation, not being adequately addressed per the set of security rules. If any gaps are found, at 540, gap action module 96 of system 72, as executed by system/server 12, generates a gap document listing any found potential gaps which can be used for addressing the potential gaps in the application.

The process flowchart of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for security handling of application code branching from requirements elicitation to operation, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for security handling of application code branching from requirements elicitation through the software development lifecycle (SDLC) to deployment and operation. In this case, the service provider can create, maintain, and support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for security handling of application code branching from requirements elicitation to operation. In this case, a computer infrastructure, such as computer system 12 (FIG. 1), can be provided and one or more systems for performing the processes of the invention can be captured (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS)

techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media/(e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for security handling of application code branching from requirements elicitation to operation. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for security handling of application code branching, comprising:
 collecting a set of security rules related to a defined security policy;
 applying the set of security rules to an application having a plurality of code branches;
 dynamically identifying, during an elicitation of requirements phase, a code branch, within an instruction order of the application, which executes outside of its current execution space, wherein the identifying includes using natural language processing on a set of documents related to the application;
 generating, when a return from the code branch is inconsistent with the set of security rules, representing a potential security gap, a gap document including the potential security gap;
 inserting customized programming that addresses the potential security gap into a security hook; and
 connecting the application to the security hook when the return from the code branch is inconsistent with the set of security rules.

2. The method of claim 1, wherein the return from the code branch is selected from a group consisting of a security hook, a safe position, and an endpoint.

3. The method of claim 1, wherein the set of documents is selected from the group consisting of business requirements, architecture design documentation, and pseudo code.

4. The method of claim 1, further comprising generating the gap document after an execution of the application.

5. The method of claim 1, further comprising terminating an execution of the application when the return from the code branch is inconsistent with the set of security rules.

6. The method of claim 1, wherein the defined security policy represents a security posture of an organization.

7. The method of claim 1, wherein the security hook is in an intermediate layer between the application and an operating system layer.

8. A computer program product embodied in a computer readable storage medium that, when executed by a computer device, performs a method for security handling of application code branching, the method comprising:
 collecting a set of security rules related to a defined security policy;
 applying the set of security rules to an application having a plurality of code branches;
 dynamically identifying, during an elicitation of requirements phase, a code branch, within an instruction order of the application, which executes outside of its current execution space, wherein the identifying includes using natural language processing on a set of documents related to the application;
 generating, when a return from the code branch is inconsistent with the set of security rules, representing a potential security gap, a gap document including the potential security gap;
 inserting customized programming that addresses the potential security gap into a security hook; and
 connecting the application to the security hook when the return from the code branch is inconsistent with the set of security rules.

9. The computer program product of claim 8, wherein the return from the code branch is selected from a group consisting of a security hook, a safe position, and an endpoint.

10. The computer program product of claim 8, wherein the set of documents is selected from the group consisting of business requirements, architecture design documentation, and pseudo code.

11. The computer program product of claim 8, further comprising generating the gap document after an execution of the application.

12. The computer program product of claim 8, further comprising terminating an execution of the application when the return from the code branch is inconsistent with the set of security rules.

13. The computer program product of claim 8, wherein the defined security policy represents a security posture of an organization.

14. The computer program product of claim 8, wherein the security hook is in an intermediate layer between the application and an operating system layer.

15. A computer system for security handling of application code branching, the computer system comprising:
 a memory medium comprising program instructions;
 a bus coupled to the memory medium; and
 a processor for executing the program instructions, the instructions causing the system to:
  collect a set of security rules related to a defined security policy;
  apply the set of security rules to an application having a plurality of code branches;
  dynamically identify, during an elicitation of requirements phase, a code branch, within an instruction order of the application, which executes outside of its current execution space, wherein the identifying includes using natural language processing on a set of documents related to the application;
  generate, when a return from the code branch is inconsistent with the set of security rules, representing a potential security gap, a gap document including the potential security gap;
  inserting customized programming that addresses the potential security gap into a security hook; and
  connecting the application to the security hook when the return from the code branch is inconsistent with the set of security rules.

16. The computer system of claim 15, wherein the return from the code branch is selected from a group consisting of a security hook, a safe position, and an endpoint.

17. The computer system of claim 15, wherein the set of documents is selected from the group consisting of business requirements, architecture design documentation, and pseudo code.

18. The computer system of claim 15, the instructions causing the system to generate the gap document after an execution of the application.

19. The computer system of claim 15, the instructions causing the system to terminate an execution of the application when the return from the code branch is inconsistent with the set of security rules.

20. The computer system of claim 15, wherein the defined security policy represents a security posture of an organization.

* * * * *